April 3, 1951 V. KLIMA 2,547,582
DIRECT CURRENT GENERATOR
Filed Feb. 19, 1948 2 Sheets-Sheet 1

Inventor:
Vilém Klima,
by Paul & Smith

April 3, 1951  V. KLIMA  2,547,582
DIRECT CURRENT GENERATOR
Filed Feb. 19, 1948  2 Sheets-Sheet 2

Inventor:
Vilém Klima,
by Paul H. Smolka

Patented Apr. 3, 1951

2,547,582

UNITED STATES PATENT OFFICE 2,547,582

DIRECT-CURRENT GENERATOR

Vilém Klíma, Prague, Czechoslovakia, assignor of one-half to Moravian Electrical Engineering Works, Olomouc, Czechoslovakia, a national corporation Application February 19, 1948, Serial No. 9,486
In Germany October 18, 1941

Section 1, Public Law 690, August 8, 1946
Patent expires October 18, 1961

10 Claims. (Cl. 322—92)

This invention relates to D. C. generators and, more particularly, to an improved D. C. welding generator and an improved method of regulation for D. C. welding generators.

In order to effect proper welding in all positions, D. C. welding generators must have certain requirements. For example, the short circuit current when striking the arc should not be too large in relation to the steady welding current, and this relation must extend over the entire range of regulation of the welder.

Additionally, the voltage should rapidly return to the desired value once the arc has been struck, the range of regulation must be large, the degree of current adjustment should be as fine as possible, the welder should be low in weight, and the welder should be capable of efficient and economical operation.

Remote control of the current regulation is desirable for efficient welding, particularly when the work may range from light articles to heavy articles, requiring different values of welding current. The electrical and mechanical losses during both no-load and loaded operation should be as low as possible for good economy. This requires efficient use of the current carrying and magnetic circuit components.

Various types of D. C. welding generators have been devised with the foregoing requirements in mind. One type of D. C. welding generator is the split-pole machine, to which the improvements of the present invention are directed. In these machines, some or all of the poles are divided into component poles of the same polarity, and different voltages are taken from the same armature by special exciting brushes for energizing the exciting windings. In these machines, all the poles, or all the poles of the same type (either leading or trailing), are supplied with voltages from main or auxiliary brushes, the voltages being either substantially constant or varying, according to the construction and location of the poles.

Also, the poles may be excited by additional windings having either the output voltage applied thereto, or a voltage increasing with the current or from brushes carrying the working current. The regulation is variously effected, either by resistances in all the exciting circuits, by brush shifting, or by air gap variation. The resistances may be potentiometers, and series connected exciting windings may be suitably tapped.

The chief problem in the design of these split pole machines is to obtain both good welding properties and good regulation, reconciliation of these being difficult. The main, or trailing, split poles are generally saturated, precluding regulation, and the leading, or cross, split poles can be only series excited for good dynamic properties. Otherwise, special neutralizing arrangements are needed.

These disadvantages are avoided in the invention welder by so arranging the poles and their windings that the magnetic flux of one main pole remains substantially constant during no-load, while that of the other main pole may be varied substantially, the combined flux magnitudes remaining constant or varying only slightly at no-load. The main split poles carry the flux active in producting the no-load voltage, while the flux of the cross split poles effects an armature voltage drop proportional to the load current. The exciting brushes flank each set of main and split poles. One main split pole may carry a compensating winding. The main poles are shunt excited, and the exciting windings for the cross split poles are differential series windings.

With the foregoing in mind, it is an object of the present invention to provide a novel, compact, highly efficient D. C. welding generator.

Another object is to provide a novel method of regulating a D. C. welding generator.

These, and other objects, advantages and novel features of the invention will be apparent from the following description and the accompanying drawings.

Figure 3:
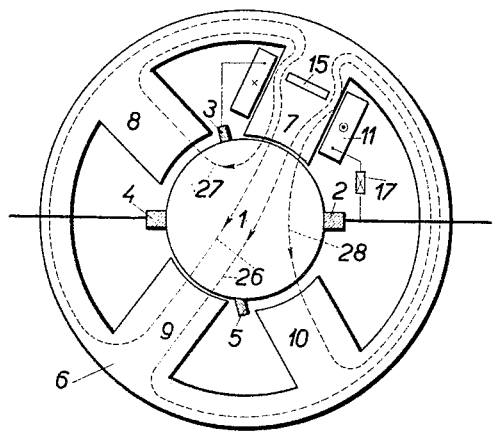
Figure 4:
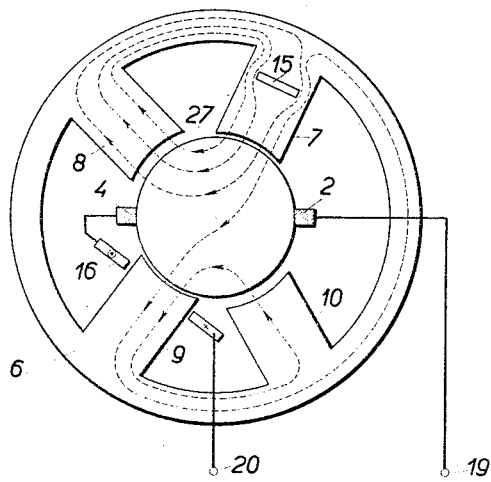

Figs. 3 and 4 schematically indicate the flux flow through the generator at no-load and when loaded, respectively.

Figure 1:
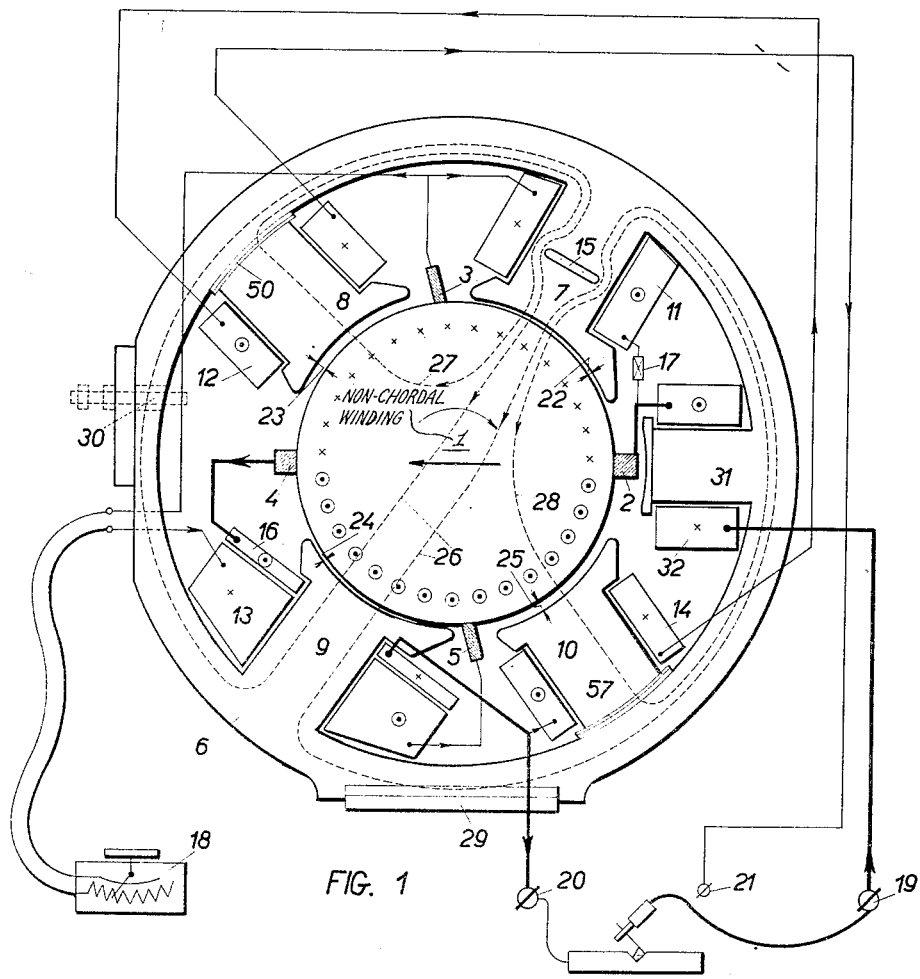
Fig. 1 is a schematic and elevation view of a D. C. welding generator according to the invention.

Referring to Fig. 1, the D. C. welding generator is illustrated as including a rotatable armature 1 associated with main brushes 2, 4 and auxiliary brushes 3, 5. The armature is wound with a substantially non-chorded bi-polar winding, and connected to a suitable current reverser, not shown. The generator is shown as of the bi-polar type, by way of example, but may be constructed with any number of pairs of poles as will be understood by those skilled in the art.

The housing, field structure or stator 6 supports two main poles 7, 9 and two cross poles 8, 10. The main poles carry shunt exciting or magnetizing windings 11 and 13, respectively, while the cross poles carry differential series exciting windings 12 and 14, respectively. The flux path through pole 7 may be suitably constricted, for a purpose to be described, as by a gap 15, and pole 9 may carry a series compensating winding 16. A fixed or adjustable resistance 17 may be connected between brush 2 and winding 11, and a remote regulator or potentiometer may be connected between brush 3 and winding 13.

Brush 2 is connected to a terminal 19 through exciting winding 32 of reversing pole 31, and brush 4 is connected to terminal 20 through compensating winding 16. Windings 14 and 12 are connected in series with each other between winding 16 and terminal 21. In the illustrated arrangement, the air gaps 22, 24 of the main poles are much smaller than the air gaps 23, 25 of the cross poles. Terminals 19, 20 and 21 may be connected to a suitable arc welding circuit, as shown.

In accordance with the invention, the strength of the operating current is regulated by adjusting the magnetic flux of $p$ main split poles of a polarity (for example poles 9) during no-load operation within wide limits, for example from zero or from negative values to a positive maximum, while the magnitude of the magnetic flux of the $p$ main split poles (7) of second or opposite polarity remains constant during no-load operation relatively to the variation of the flux of the first $p$ main split poles or only varies slightly relatively thereto, the value to which the fluxes of the $2p$ main split poles of both polarities are adjusted during no-load operation remaining constant with the value of the loading current according to the regulating position, or varying only slightly.

This method of regulation affords a number of advantages as compared with known constructions. When the operating current is adjusted to the maximum value, the two main split poles are fully excited, so that no flux passes through the cross poles 8, 10 during no-load operation. This flux would not induce any current flow between the brushes 2, 4 and is, in effect, a stray flux. It would therefore only increase the dimensions of the machine as in known constructions having an uneven number of poles, with which this stray flux must be overcome by providing large air gaps, and large ampere-turns are necessary in order to overcome this air gap during operation. With the arrangement according to the invention, no large air gaps below the poles 8, 10 are necessary since these poles lie in an equipotential plane with symmetrical excitation, so that no lines of force 27, 28 are present. The ampere-turn consumption is therefore small for the excitation both of the no-load flux and of the cross flux, so that the losses and the copper consumption are also small.

Figures 2A, 2B, 2C:
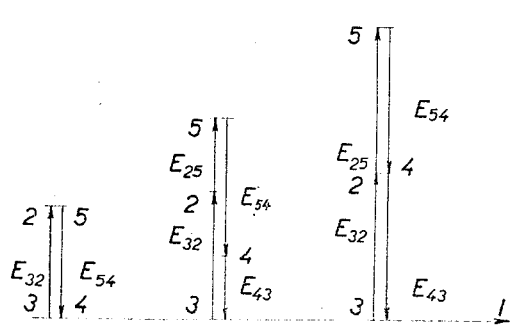
Figs. 2a through 2d illustrate voltage relations of the generator.
Figure 2D:
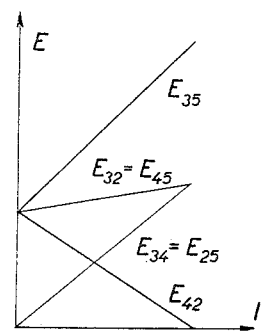

Since no shunt windings are provided on the cross poles, the no-load flux can be forced, proportionally to the working current and without time lag, into the cross poles, since it is not damped by any shorted-circuits, so that the curve of the voltages induced in the armature is that shown in Figure 2. In Figure 2, $E_{32}$, $E_{54}$, $E_{43}$, $E_{25}$, $E_{42}$ are the voltages between brushes of equal sign. Increase in the flux is opposed by compensating currents induced in the windings 11 and 13, which is very favourable since the voltage $E_{23}$ of the armature induced in the part 2—3 of the armature (Figure 2) is consequently temporarily smaller than in the steady final position, so that the differential compounding effect $E_{43}$ is relatively greater. This means that the steady final value of the short-circuit current is reached aperiodically without exceeding the final value in spite of the damping action of the eddying currents, because the resultant voltage $E_{42}$ forcing the current is temporarily smaller than in the steady final condition, as may readily be seen from Figures 2a–d.

When the operating and short-circuit current is adjusted to lower values, the excitation of the main split pole 9 is reduced. The case will be considered, for example, where this excitation is interrupted. In this case, the excitation is non-symmetrical, the cross poles 8, 10 are no longer in an equipotential plane and a more or less large flux (lines of force 27, 28, Figure 1, again shown in Figure 3 for the sake of clarity) flows therein, which does not contribute in any way to the no-load voltage $E_{42}$, since these fluxes induce, in the armature conductors of one and the same coil, voltages which cancel one another. This stray flux, however, contributes to a considerable extent to the fact that the saturation of the pole 7 does not noticeably fall in spite of the falling no-load voltage, so that stable operation is also possible with self-excitation. According to the invention, therefore, the exciting windings of the pole 7, which carry more or less constant fluxes, are self-excited from brushes 2, 3 flanking these poles. Since the armature reaction tends to increase the excitation of the poles 7, 9, a compensating winding 16 is provided at least on the pole 9, and the flux of the pole 7 cannot in any case increase too greatly owing to their saturation, which can be further increased by providing constructions 15.

Upon loading, a flux following the curve shown in Figure 4 is set up at a certain current, to which, from the characteristic curve, for example, one half of the no-load voltage belongs, as is shown in Figure 4. The greater part of the no-load flux of the pole 7 is forced into the pole 8, some of the lines of force which passed from 7 to 9 during no-load operation being replaced by those which pass from 10 to 9. When the flux has changed in 9, no current peak is also to be expected upon a sudden short circuit, especially as no damping currents in highly conductive turns oppose the alternation of the flux in 10 and in parts of the yoke 6. The eddy currents can be reduced in known manner by lamination of the flux-carrying parts and by small wall thicknesses of the yoke 6. A further improvement of the dynamic behaviour is achieved according to the invention owing to the fact that by correct selection of the saturation and of the number of turns of the compensating winding 16, increasing operating current is accompanied by a more or less great increase in the fluxes 7 and 9 in the steady condition. As has already been explained, a sudden increase in the main split pole fluxes is not possible owing to the damping action of the shunt windings 11, 13, so that the harmful effect of the eddy currents of the cross flux poles and of the yokes is thus nullified. This renders it possible also to obtain completely satisfactory dynamic properties with split pole machines without neutralisation of the self-excitation and differential-excitation. The regulation of the flux during no-load operation, that is to say, the adjustment of the no-load voltage, is so effected according to the invention that the exciting winding of the main split poles of second polarity, the flux of which is not changed at all or is at least only slightly changed relatively to the variation of the flux of the first main split pole during no-load operation, form an independent exciting circuit which is fed by brushes (2 and 3 or 5 and 4) electrically flanking the main split poles with an armature voltage which is proportional to the difference of the main split pole fluxes of the first and second polarity. Correspondingly, on the other hand the exciting winding of the main split poles of first polarity, the flux of which can be adjusted within wide limits, for example from 0 or from negative values up to a positive maximum, for the purpose of varying the operating values during no-load operation, are fed with an armature voltage increasing more rapidly with the load either by the same brushes (2 and 3 or 5 and 4) flanking the main split poles or by brushes 3 and 5 flanking main and cross split poles of similar sign.

Feeding the exciting windings of the main split pole 9 with an armature voltage increasing with the load has the advantage that, if the compensating winding is correctly selected, steeper static characteristic curves are obtained with smaller currents with which this excitation is weak or is interrupted than with the largest currents, whereby the range of regulation is increased. The welding properties are, as has already been explained, also improved by this indirect compounding.

The regulation can naturally be effected by regulating both exciting windings, but it has been found that it is sufficient to regulate merely the winding 13 and to connect the pole 11 directly or through a non-regulatable or fixed resistance 17 to the brushes, as is shown in Figure 1. It may be advantageous to make the effective ohmic value of resistance 17 dependent upon currents. This can be accomplished by utilizing a resistance having a positive temperature co-efficient of resistivity so that, with increased heating due to increased current flow through the resistance, the effective ohmic value of the resistance will be increased proportionately. It has hitherto been usual to employ a special regulator for the remote regulation, but this has the disadvantage that the current can not only be regulated by the welder at the place of welding, but also by an unskilled hand from the welding machine. A special remote regulator has the disadvantage that it is not necessarily always and under all circumstances available at the proper time. These disadvantages are overcome, in accordance with the invention owing to the fact that the normal regulator 18 mounted on the welding machine is removable and may be constructed as a remote regulator. In this way, it is brought about in the simplest and most suitable possible way that the machine is always ready for operation by remote regulation and the welding current can definitely only be regulated from the place of work throughout the entire range of regulation.

Since, as has already been stated, the flux in the main poles increases more slowly upon a sudden short circuit in order to be temporarily smaller than in the steady final condition, it is advisable that short-circuited turns be employed thereon or that windings disconnected during operation should be short circuited in this position. Thus, for example, and according to the invention, in the position of regulation in which the exciting winding 13 is disconnected, it can be short circuited by means of the regulator 18. Similarly, with the largest currents, the compensating winding 16 can also be short-circuited. The range of regulation can be increased by reversing the direction of the current in the compensating winding. If the smallest obtainable current is not sufficiently small or the static characteristic curve is no longer sufficiently steep, the range of regulation can be increased by arranging on the cross poles series-connected windings 12, 14 which increase the armature reaction. These windings must naturally only be dimensioned for correspondingly small currents, and they can only be provided on cross poles of a single polarity whereby more favourable properties can be obtained, especially in the lowermost position of regulation, owing to the non-symmetrical excitation.

The regulation hereinbefore described is purely electromagnetic in that the magnetic properties of the machine are varied in the desired manner by electrical regulation. However, any desired magnetic variation can readily be produced by mechanical means and the range of current thereby regulated, and in some cases the two forms of regulation may be combined. For example, it is possible, in the known manner, to vary the cross section of the poles or of the air gaps in the poles 8, 10 by the insertion or withdrawal of cores, in which case merely two simply adjustable electrical regulating positions are available, namely with the winding 13 in or out of circuit, so that the resistance 18 is replaced by a small switch.

In order to bring about as great as possible a regulating action with non-symmetrical excitation, it may be an advantage to make the magnetic resistances between the individual poles and the armature different, and in particular to make the air gap between the main split poles of second polarity and the armature 22 smaller than that between the armature and the main split poles of first polarity 24. For the same reason, it is advisable to make the air gap between the cross split poles and the armature 22, 23 and the yoke 50, 57 larger than that between the main split poles of second polarity and the armature 22 but smaller than that between the main split poles or first polarity and the armature 24.

Having regard to the compact construction, it is further advisable to employ only one reversing pole to four split poles and in some cases to make the pole gaps in which the working current is commutated larger than the pole gaps in which the exciting current is commutated. In order to obtain sufficient space for the winding of the reversing pole, it is also advisable to space apart the pole shanks flanking this pole, as is shown in Figure 1.

Since, in view of the fact that the induced electromotive force is never zero, the fluxes of the main split poles are greater in the short-circuited condition than the fluxes of the cross split poles and the short-circuited condition is also not permanent it may be advantageous to make the pole arc of the main split poles larger than that of the cross split poles, and in particular larger than that of the cross split poles 10. A further saving of material is achieved owing to the fact that the cross section of the yokes is not constant but is reduced between the split poles of similar polarity, suitable apertures for the current lead-in 30 being provided at these points. According to the invention, the most common transportable type is so constructed that the wheel axles and the leaf springs 29 employed for the springing are so arranged that they form part of the magnetic path, so that the yoke can accordingly be made weaker at this point.

While a specific embodiment of the invention has been shown and described in detail to illustrate the application of the invention principles, it should be understood that the invention may be otherwise embodied without departing from such principles.

I claim:

1. In a D. C. generator, a bi-polar substantially non-chordally wound armature; a pair of main brushes connected to an output circuit and a pair of auxiliary brushes operatively associated with said armature; a pair of split poles each comprising a main pole and a cross pole; a pair of shunt related magnetizing windings each arranged on a main pole; a pair of differential series connected windings each arranged on a cross pole; one of said shunt related windings being energized from a main brush and an auxiliary brush flanking the associated one main pole; and the other shunt related winding including an adjustable impedance therein and being connected across said auxiliary brushes; whereby the excitation of said one main pole remains constant at no-load and varies in accordance with the output current while the excitation of the other main pole may be adjusted, through said impedance, over a wide range at no-load and the exciting voltage varies directly in accordance with the output current.

2. In a D. C. generator as claimed in claim 1, a compensating winding arranged on said main pole and connected in series with the output circuit.

3. In a D. C. generator as claimed in claim 1, a non-adjustable impedance in series circuit relation with said one shunt winding.

4. In a D. C. generator as claimed in claim 1, a magnetostriction in said one main pole to increase the saturation thereof.

5. A D. C. generator as claimed in claim 1 including a commutating pole arranged between a main and cross pole and having a magnetizing winding in series with the output circuit.

6. In a D. C. generator as claimed in claim 1, a compensating winding arranged on said other main pole and connected in series with the output circuit, said series magnetizing windings being connected in series with said compensating winding.

7. A D. C. generator as claimed in claim 1 in which said adjustable impedance comprises a remotely located potentiometer.

8. A D. C. generator as claimed in claim 1 including $p$ pairs of split poles, where $p$ is an integral number.

9. A D. C. generator as claimed in claim 1 including a commutating pole arranged between a main and cross pole and having a magnetizing winding in series with the output circuit, the flanking main and cross pole being more widely spaced than the others of said poles to accommodate said commutating pole.

10. In a D. C. generator as claimed in claim 1, a non-adjustable resistance in series circuit relation with said one shunt winding, said non-adjustable resistance having an effective ohmic value varying in value with the exciting current.

VILÉM KLÍMA.

REFERENCES CITED

The following references are of record in the file of this patent:

UNITED STATES PATENTS

| Number | Name | Date |
|---|---|---|
| 1,501,878 | Burke | July 15, 1924 |

FOREIGN PATENTS

| Number | Country | Date |
|---|---|---|
| 803,455 | France | July 6, 1936 |